United States Patent [19]
Sood et al.
[11] Patent Number: 4,678,657
[45] Date of Patent: Jul. 7, 1987

[54] PRODUCTION OF HIGH PURITY SUBSTANTIALLY SPHERICAL METAL HYDROXIDE/OXIDE PARTICLES FROM THE HYDROLYSIS OF A METAL ALKOXIDE AEROSOL USING METAL HYDROXIDE/OXIDE SEED NUCLEI

[75] Inventors: Ajay Sood, Ross Township, Allegheny County; Robert A. Marra, Penn Hills, Pa.

[73] Assignee: Aluminum Company of America, Pittsburgh, Pa.

[21] Appl. No.: 742,770

[22] Filed: Jun. 10, 1985

[51] Int. Cl.[4] .......................... C01E 7/02; C01E 7/30; C01E 7/36; C01B 13/14

[52] U.S. Cl. ...................................... 423/600; 423/592

[58] Field of Search ................ 423/630, 592, 610, 600

[56] References Cited

U.S. PATENT DOCUMENTS

| | | | |
|---|---|---|---|
| 3,403,001 | 9/1968 | Mas et al. | 23/202 |
| 3,406,012 | 10/1968 | Rahn | 23/202 |
| 3,647,374 | 3/1972 | Nomura et al. | 423/630 |
| 3,663,283 | 5/1972 | Hebert et al. | 106/288 |
| 3,914,396 | 10/1975 | Bedetti et al. | 423/613 |
| 4,117,106 | 4/1978 | Bendig et al. | 423/630 |
| 4,241,042 | 12/1980 | Matijevic et al. | 423/610 |
| 4,387,085 | 6/1983 | Fanelli et al. | 423/630 |
| 4,532,072 | 7/1985 | Segal | 423/630 |

FOREIGN PATENT DOCUMENTS

| | | |
|---|---|---|
| 84301275.8 | 5/1984 | European Pat. Off. . |
| 2070579B | 1/1983 | United Kingdom . |

OTHER PUBLICATIONS

Ingebrethsen, B. J., and Matijevic, E., "Kinetics of Hydrolysis of Metal Alkoxide Aerosol Droplets in the Presence of Water Vapor", *Journal of Colloid and Interface Science*, vol. 100, No. 1, Jul., 1984, pp. 1–16.

Ingebrethsen, B. J., and Matijevic, E., "Preparation of Uniform Colloidal Dispersions by Chemical Reactions in Aerosols-2, Spherical Particles of Aluminum Hydrous Oxide", *Journal of Aerosol Science*, vol. 11, 1980, pp. 271–280.

Visca, M. and Matijevic, E., "Preparation of Uniform Colloidal Dispersions by Chemical Reactions in Aerosols 1, Spherical Particles of Titanium Dioxide", *Journal of Colloid and Interface Science*, vol. 68, No. 2, Feb., 1979, pp. 308–319.

Centro Ricerche Novara, Instituto Guido Donegani, "Monodisperse Titanium Dioxide Production: Product and Applications".

*Primary Examiner*—John Doll
*Assistant Examiner*—Chung K. Pak
*Attorney, Agent, or Firm*—Andrew Alexander; John P. Taylor

[57] ABSTRACT

The invention comprises a process for the production of high purity substantially spherical metal oxide particles using seed nuclei without introducing impurities into the desired product which comprises forming a metal alkoxide vapor; reacting the vapor with a non-reactive gas containing sufficient water vapor to hydrolyze a portion of the metal alkoxide vapor to form solid seed nuclei of metal hydroxide; cooling the remaining metal alkoxide vapor containing the metal hydroxide seed nuclei sufficiently to form an aerosol comprising finely divided metal alkoxide liquid condensed on the solid metal hydroxide seed nuclei; hydrolyzing the metal alkoxide aerosol by contact with water vapor to hydrolyze the metal alkoxide liquid to form substantially spherical metal hydroxide particles; and calcining the substantially spherical metal hydroxide particles to form the corresponding metal oxide.

13 Claims, 2 Drawing Figures

PRODUCTION OF HIGH PURITY SUBSTANTIALLY SPHERICAL METAL HYDROXIDE/OXIDE PARTICLES FROM THE HYDROLYSIS OF A METAL ALKOXIDE AEROSOL USING METAL HYDROXIDE/OXIDE SEED NUCLEI

BACKGROUND OF THE INVENTION

1. Field of the Invention

This invention relates to the production of substantially spherical metal oxide and metal hydroxide particles. More particularly, this invention relates to the high purity production of such particles by vapor phase hydrolysis of an aerosol containing metal alkoxides produced using seed made from the same materials.

2. Background Art

Metal oxide and metal hydroxides are useful in the formation of ceramic materials, paint pigments, fire retardants and the like. Of particular interest in the formation of ceramics are spherical, non-agglomerated particles of substantially uniform size because of the possible reduction of sintering time and temperature while increasing mechanical strength and improving reliability. When such particles are of high purity, they are especially useful in the production of ceramic substrates for the semiconductor industry where even trace impurities of certain materials, e.g. heavy metal oxides, such as thorium oxide which emits alpha particles, are highly undesirable.

Methods for the production of substantially spherical metal oxides and hydroxides from the hydrolysis of aerosols formed from metal alkoxides are known. For example, Visca et al in "Preparation of Uniform Colloidal Dispersions by Chemical Reactions in Aerosols: 1. Spherical Particles of Titanium Dioxide", published in the *Journal of Colloid and Interface Science,* Vol. 68, No. 2, Feb., 1979, at pp. 308–319, discussed the production of $TiO_2$ spheres of narrow size distribution using titanium alkoxide and $TiCl_4$ starting materials in which the starting material is first evaporated into a gaseous carrier and then condensed onto AgCl seed nuclei in a condensation zone to form an aerosol dispersed in the gas. The aerosol is then hydrolyzed by contact with water vapor to form the spherical particles of $TiO_2$. A similar process is described by the authors in Matijevic et al U.S. Pat. No. 4,241,042.

Ingebrethsen et al in "Preparation of Uniform Colloidal Dispersions by Chemical Reactions in Aerosols - 2. Spherical Particles of Aluminum Hydrous Oxide", *Journal of Aerosol Science,* Vol. 11, Pergamon Press, 1980, Great Britain, at pp. 271–280, describe the formation of uniform colloidal aluminum hydrous oxide aerosols by hydrolyzing droplets of aluminum sec-butoxide. The use of AgCl nucleating material is again described. Ingebrethsen et al particularly caution about preserving the laminar flow in the hydrolysis zone, indicating, on page 273, that turbulence in the flow caused a broadening of the size distribution of their final solid particles.

The deleterious effect of turbulence in the hydrolysis zone is also discussed in European patent application No. 117,755 where the use of turbulent flow is employed to initially form the aerosol. The turbulent flow is used by the patentees in the aerosol generating stage to form the aerosol by mixing an inert gas stream containing vapor of a hydrolyzable metal compound with a cold inert gas stream. By mixing the two streams in a turbulent flow with a Reynolds number equal to or higher than 1800, an aerosol can apparently be formed without requiring the generation of solid nuclei. The patentees, however, warn that laminar flow must be reestablished in the subsequent hydrolysis zone to reduce the risk of coalescence of the droplets coming from the previous aerosol forming stages.

Formation of an aerosol without the use of seed nuclei is found in the aforementioned Matijevic U.S. Pat. No. (and its U.K. counterpart patent, GB No. 2070579B) at column 3, line 14, to column 4, line 3, under a discussion of homogeneous and heterogeneous nucleation. Conditions of supersaturation are used to produce the self-induced or spontaneous nucleation referred to as homogeneous. However, the patentees state that homogeneous nucleation is more sensitive to temperature, pressure and velocity gradients in a flow system, which results in concentration gradients. Moreover, homogeneous nucleation is said to be more easily affected by contaminants and irregularities in container surfaces. As a consequence, the patentees conclude, it is more difficult to control the particle size in a homogeneous nucleation system.

It would, therefore, be highly desirable to produce substantially spherical metal oxide or hydroxide particles of high purity, i.e., without the introduction of impurities as nucleating agents, while providing uniform particle size production at high flow rates not previously thought possible without the use of foreign nucleating agents and without the necessity of maintaining low volume laminar flows

SUMMARY OF THE INVENTION

It is, therefore, an object of the invention to produce substantially spherical particles of metal oxide or hydroxide of uniform particle size and high purity.

It is another object of the invention to produce substantially spherical particles of metal oxide or hydroxide of uniform particle size and high purity while maintaining high production rates under turbulent flow conditions.

It is yet another object of the invention to produce substantially spherical particles of metal oxide or hydroxide of uniform particle size and high purity while maintaining high production rates under turbulent flow conditions by the use of a seed producing step wherein seed nucleating agents of the metal oxide or hydroxide are produced whereby the aerosol droplets may be formed on seed nucleating particles which are not impurities. to the final hydrolyzed product.

These and other objects of the invention will be apparent from the following description and accompanying drawings.

In accordance with the invention, a process for the production of high purity substantially spherical metal oxide particles using seed nuclei without introducing impurities into the desired product comprises forming a metal alkoxide vapor; reacting the vapor with a nonreactive gas containing sufficient water vapor to hydrolyze a portion of the metal alkoxide vapor to form solid seed nuclei of metal hydroxide; cooling the remaining metal alkoxide vapor containing the metal hydroxide seed nuclei sufficiently to form an aerosol comprising finely divided metal alkoxide liquid condensed on the solid metal hydroxide seed nuclei; hydrolyzing the metal alkoxide aerosol by contact with water vapor to hydrolyze the metal alkoxide liquid to form substantially spherical metal hydroxide particles: and calcining the substantially spherical metal hydroxide particles to form the corresponding metal oxide.

DESCRIPTION OF THE PREFERRED EMBODIMENT

Figure 1:
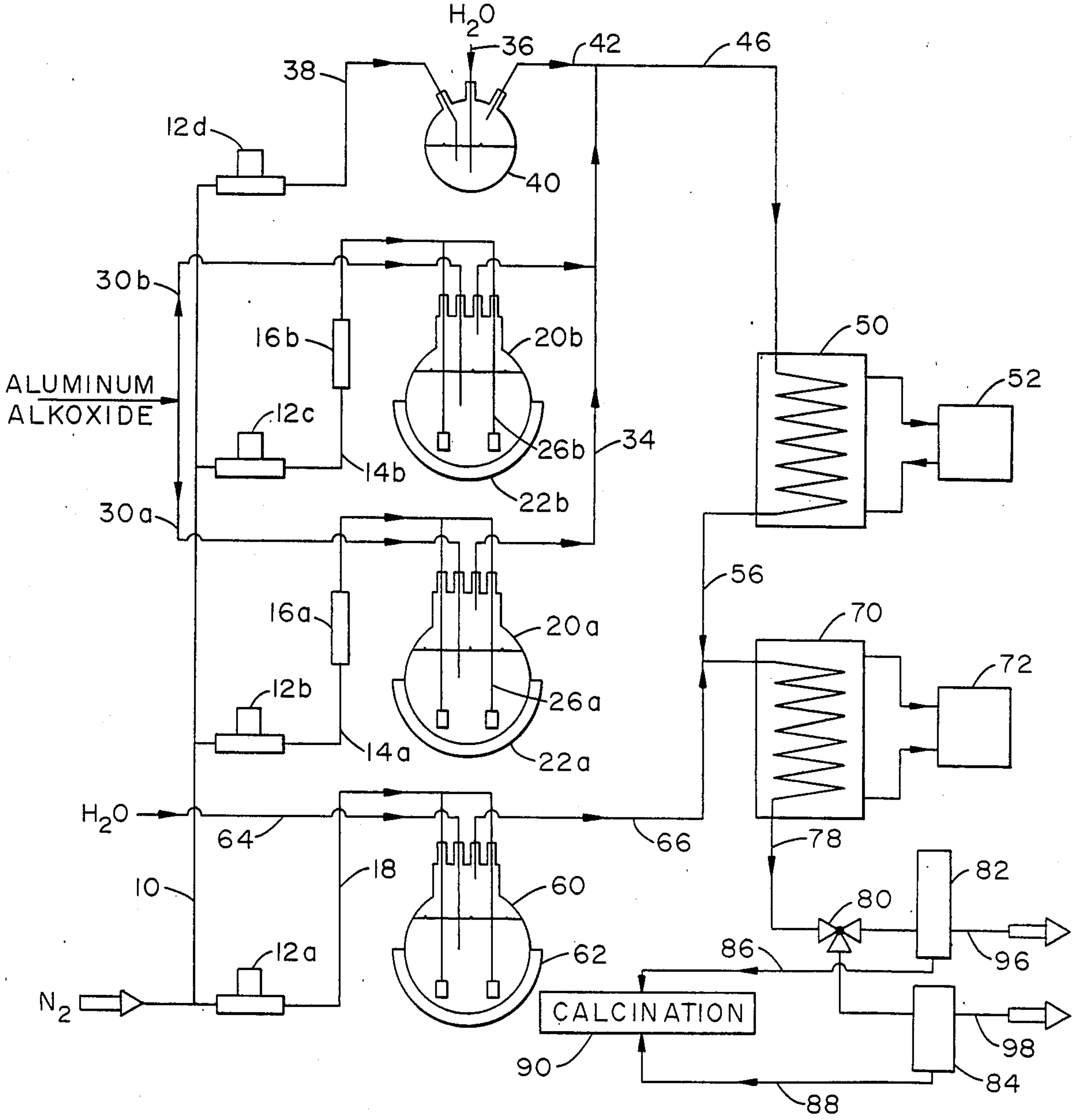
FIG. 1 is a diagrammatic flowsheet illustrating one embodiment of the process of the invention.

The process of the invention provides for the production of substantially spherical metal hydroxide/oxide particles by the hydrolysis of an aerosol containing metal alkoxide vapors which have been condensed on seed nuclei comprising the hydrolyzed product of the same metal to thereby preserve the desired high purity of the end product while expediting formation of the aerosol by the use of seed nuclei.

The term "substantially spherical", as used herein, is intended to define an equiaxed particle having a t/d ratio of greater than 0.7 but less than 1.3 where t equals the thickness of the particle and d equals the diameter of the particle.

Referring to the flow diagram of FIG. 1, a source of high purity non-reactive gas which is oxygen and moisture free and which will, hereinafter, be referred to as nitrogen ($N_2$) for illustrative purposes only, is fed into line 10 which is connected, in turn, to mass flow controllers **12*a*, 12*b*, 12*c* and 12*d*, to permit adjustment of the flow of nitrogen gas therethrough. The $N_2$ gas, passing through controllers 12*b* and 12*c*, respectively, flows, via lines 14*a* and 14*b*, into nitrogen preheaters 16*a* and 16*b* where the nitrogen gas is heated to a temperature of from 100° to 250° C., preferably to about 130° to 170° C., before passing into vaporizers 20*a* and 20*b*. A source of metal alkoxide, such as, for example, aluminum alkoxide, as shown in the figure, is fed into vaporizers 20*a* and 20*b*, respectively, via lines 30*a* and 30*b*. Vaporizers 20*a* and 20*b* are heated by heating jackets 22*a* and 22*b* to provide a temperature of about 100 to 250° C., preferably about 130° to 170° C., for the metal alkoxide vapor and nitrogen gas mixture which leaves the vaporizers via line 34**.

In the illustrated embodiment, the nitrogen, passing through each of the alkoxide vaporizers has a flow of about 50 liters per minute. The amount of metal alkoxide liquid flowing into alkoxide vaporizers **20*a* and 20*b* must, therefore, be sufficient to maintain a level of metal alkoxide liquid in the vaporizers above the outlets of the respective nitrogen inlet tubes 26*a* and 26*b*** which are connected to porous fritted disks of sufficiently fine porosity to allow bubbling of nitrogen gas through the alkoxide liquid in bubbles of about ½ millimeter to thereby saturate the nitrogen gas with alkoxide.

Nitrogen gas passes through mass flow controller **12*a* and then flows, via line 18, into a water vaporizer 60 which is maintained at a temperature of from 20° to 80° C., preferably about 40° to 45° C., and most preferably about 42° C., via heater 62. The nitrogen bubbles through the distilled, deionized water which is fed into water vaporizer 60 from an external source via line 64. The heated nitrogen/water vapor mixture exits vaporizer 60 via line 66** where it is blended with the metal alkoxide aerosol, as will be described below.

The amount of nitrogen flowing through mass flow controller **12*a*** when 100 liters of $N_2$ per minute are flowing through the metal alkoxide liquid, should be about 20 liters per minute to provide a ratio of about 5 parts nitrogen passing through the metal alkoxide liquid per 1 part passing through the water to provide an acceptable metal alkoxide/water mixture in the gas/vapor streams upon subsequent merger in the hydrolysis zone to insure complete hydrolysis of the metal alkoxide. The amount of water vapor which will be blended with the aerosol in the hydrolyzer is in excess of the stoichiometric amount required to hydrolyze the alkoxide. Preferably, the amount of water vapor used is 4–5 times the stoichiometric amount needed for complete hydrolysis of the alkoxide, but it can be much higher.

Nitrogen flowing through mass controller **12*d* passes through line 38 to seed water vaporizer 40 into which also is fed a supply of water via line 36. The water used is a very high purity, deionized water. Water vaporizer 40 is maintained at room temperature and has a very low nitrogen flow rate therethrough, e.g., about 1 cubic centimeter (cc) per minute to provide a very small amount of water vapor in the nitrogen leaving seed vaporizer 40 at line 42. By using a very low nitrogen flow rate, a very small amount of water vapor is introduced into the nitrogen flow. This nitrogen/water vapor stream passes through line 42 at a rate of from about 0.0001 to 100 cc per minute to blend with the nitrogen/metal alkoxide vapors in line 34. The flow rate of the non-reactive gas carrying water vapor through line 42 should be from $2\times10^{-9}$ to $2\times10^{-3}$ times the flow rate of the non-reactive gas containing the metal alkoxide vapor in line 34, e.g., when 100 parts of nitrogen gas flow through the heated metal alkoxide liquid, the flow rate of nitrogen through the water should be from $10^{-1}$ to $10^{7}$ parts. The nitrogen/metal alkoxide vapor may, for example, have a flow of 35 liters per minute when the nitrogen flow through the seed water vaporizer is 1 cc per minute. The mixture then flows through line 46 to condenser 50**.

As the two streams blend together, the water vapor in the stream from line 42 reacts with the metal alkoxide vapors in the stream from line 34 to form seed nuclei of roughly 0.001 to 0.01 micron particle size of metal hydroxide by the gas-gas hydrolysis reaction between the water vapor and the metal alkoxide vapor. This reaction provides a concentration of seed particles of about $10^5$ to $10^9$ nuclei per cc. The generation of seed nuclei can occur in line 46 which is kept hot, e g., about 150° C. Alternatively, the seed-producing hydrolysis reaction can be accomplished in a separate, temperature controlled vessel.

It should be further noted that an increase in the concentration of seed nuclei to as high as $10^8$ nuclei per cc will increase the aerosol production rate and lower the liquid wall losses in the condenser thus increasing the powder yield in the hydrolyzer.

The term "metal hydroxide, as used herein to define the hydrolysis reaction product of the metal alkoxide with water vapor, is intended to include metal oxides as well as metal hydroxides, i.e., a mixture which may include both materials.

This mixture of nitrogen/metal alkoxide/metal hydroxide seed nuclei then passes into condenser 50 which is cooled by an external cooling source 52 to a temperature of from −40° C. to +40° C., preferably approximately +2° C., which causes the metal alkoxide vapors to condense on the metal hydroxide seed nuclei to form an aerosol comprising a fine mist of metal alkoxide (on metal hydroxide seed) dispersed in the nitrogen gas. This aerosol leaves condenser 50 via line 56 where it blends with the stream of nitrogen gas in line 66 which is saturated with water vapor. The residence time of the aerosol in condenser 50 is from 0.1 to 1.0 second, preferably about 0.2 second. The ratio of the aerosol flow to the water vapor flow is about 5:1. For example, if the aerosol flow into the condenser is about 35 liters per minute, the water vapor flow should be about 7 liters per minute.

The blended gas streams then flow into hydrolysis chamber 70 which is maintained at a temperature of 25° to 100° C., preferably 40° to 60° C., and most preferably, 50° C. by temperature controlling source 72. The metal alkoxide aerosol reacts with the water vapor to hydrolyze the metal alkoxide to the corresponding metal hydroxide. Typical residence time in hydrolysis chamber 70 may be about 1 to 2 seconds, preferably about 1.5 second.

The nitrogen gas/water vapor and metal hydroxide particles then exit hydrolyzer 70 via line 78 to a flow divider 80 which divides the flow into two streams flowing, respectively into filters 82 and 84. Solids, i.e., the metal hydroxides, pass from filters 82 and 84, respectively, via lines 86 and 88 to a calcination stage 90 where the metal hydroxides are calcined, for example, for $Al_2O_3$, at a temperature of 1100° C. for 2 to 4 hours to form the corresponding metal oxide, e.g., alpha alumina from aluminum alkoxide. The nitrogen, water vapors and alkanol vapors exit at lines 96 and 98 where they may be subject to further processing to recover and recycle the alkanol and nitrogen values, if desired.

The flow of the mixture of nitrogen/metal alkoxide vapors/seed nuclei/water vapor in line 46 entering condenser 50 is sufficiently high to produce a turbulent flow to provide for interaction between the metal alkoxide vapor and the water vapor to provide the hydrolysis reaction generating the seed nuclei. Typically, the flow should be sufficient to provide a Reynolds number of greater than 2000, and preferably more than 10,000. The Reynolds number is calculated as follows:

$$Re = dvp/u$$

where:

Re = Reynolds number (dimensionless)
d = inside tube diameter in cm
v = gas velocity in cm/sec
p = gas density in grams/cc
u = gas viscosity in poise In accordance with the invention, this turbulent flow is maintained in exit line 56 from condenser 50, as well as in hydrolyzer 70, to obtain proper mixing of the streams from lines 56 and 66 and completion of the hydrolysis reaction within hydrolyzer 70.

Figure 2:
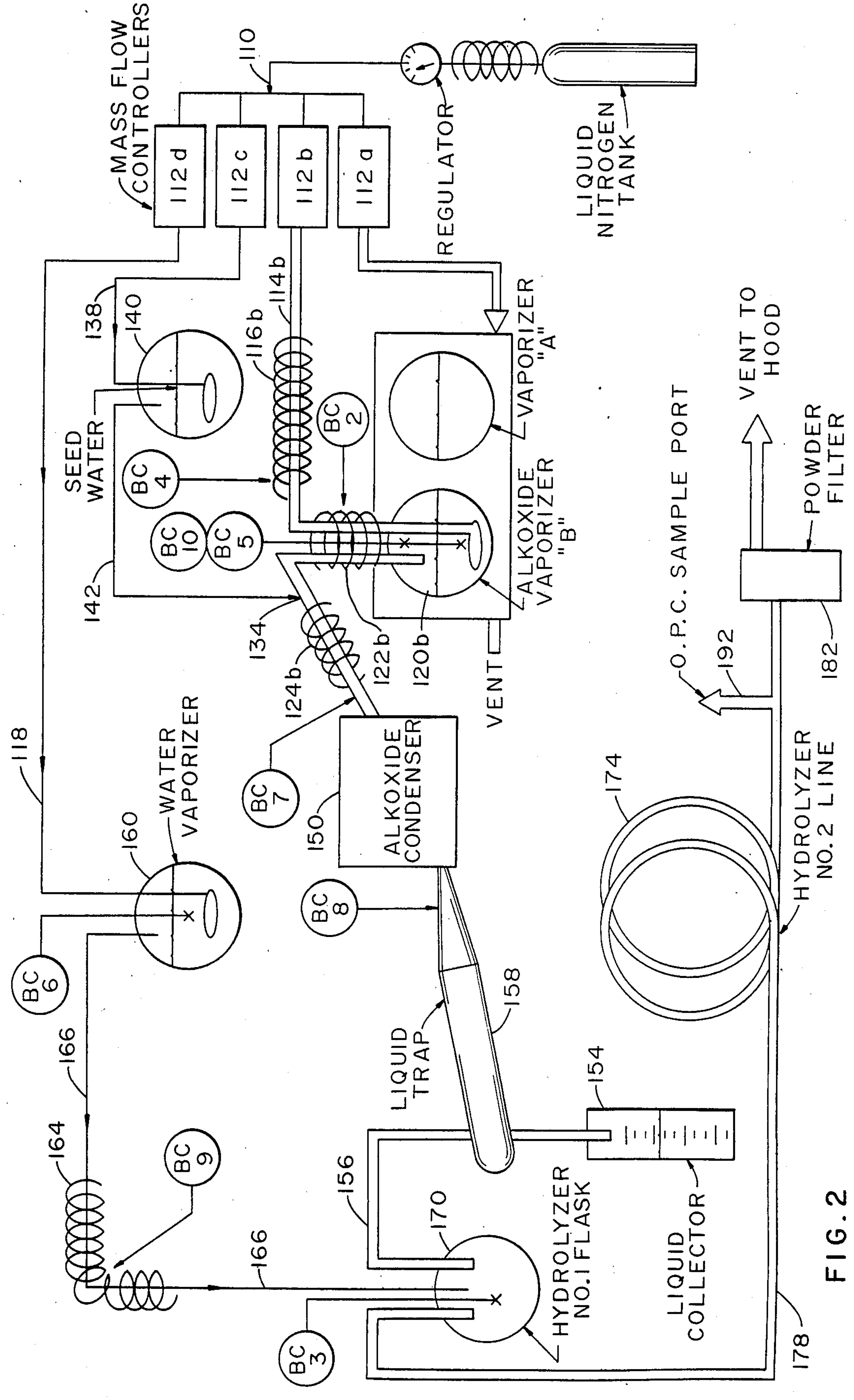
FIG. 2 is a diagrammatic flowsheet illustrating another embodiment of the invention.

Referring now to the flow diagram of FIG. 2, an alternate embodiment is illustrated which varies slightly from the scheme shown in FIG. 1 by the use of two hydrolyzers in series and a liquid trap 158 to catch liquid from condenser 150 which results from the condensation of alkoxide vapors on the walls of the condenser. In this embodiment, a source of high purity, oxygen and moisture free gas such as nitrogen is fed into line 110 which is connected, in turn, to mass flow controllers **112*a*, 112*b*, 112*c* and 112*d*, which are used to adjust the flow of the nitrogen gas therethrough. The $N_2$ gas, passing through controller 112*b*, flows, via line 114*b*, into nitrogen preheater 116*b* where the nitrogen gas is heated to a temperature of from 100° to 250° C., preferably to about 130° to 150° C., before passing into alkoxide vaporizer 120*b* which contains a metal alkoxide in liquid form. The nitrogen and alkoxide vapor, flowing from vaporizer 120*b*, is further heated by heating jackets 122*b* and 124*b* to maintain the mixture at the above recited temperature as the vapor and nitrogen gas mixture leaves vaporizer 120*b* via line 134. A parallel flow through a second vaporizer may also be used with nitrogen flowing through controller 112*a***.

Nitrogen gas passing through mass flow controller **112*d* flows, via line 118, into a water vaporizer 160. The nitrogen/ water vapor mixture exits vaporizer 160 via line 166 which passes through a heating jacket 164** to heat the mixture to a temperature of about 40° to 45° C. prior to blending the stream with the metal alkoxide aerosol stream in the first hydrolyzer, as will be described below.

Nitrogen flowing through mass controller **112*c* passes through line 138 to seed water vaporizer 140 which is maintained at room temperature as in the previously described embodiment. The nitrogen/water vapor stream from seed water vaporizer 140 passes through line 142 to blend with the nitrogen/metal alkoxide vapors in line 134 before the mixture enters condenser 150**.

As previously described with respect to FIG. 1, as the two streams blend together, the water vapor in the stream from line 142 reacts with the metal alkoxide vapors in the stream from line 134 to form the desired seed nuclei of metal hydroxide by the gas-gas hydrolysis reaction between the water vapor and the metal alkoxide vapor.

The mixture then passes into condenser 150 which is cooled by an external cooling source (not shown) which causes the metal alkoxide vapors to condense on the metal hydroxide seed nuclei to form an aerosol comprising a fine mist of metal alkoxide (on metal hydrate seed) dispersed in the nitrogen gas. This aerosol leaves condenser 150 through a liquid trap 158 from which the aerosol passes, via line 156, to flow into first hydrolysis chamber 170. Any alkoxide liquid which condenses on the walls of condenser 150 flows out of trap 158 into a liquid collector 154.

The nitrogen/water vapor mixture from vaporizer 160 also flows into hydrolyzer 170 via line 166. This stream mixes with the aerosol entering hydrolyzer 170 via line 156 to hydrolyze the metal hydroxide in the aerosol to form the desired substantially spherical particles of metal hydroxide/oxide.

The nitrogen gas/water vapor and metal hydroxide particles then exit the first hydrolyzer 170 via line 178 to a second hydrolyzer 174 comprising a coiled tube maintained at ambient temperature. The stream can be sampled via an optical particle counter sample port 192 and goes to a filter 182 where the metal hydroxide/oxide powder is separated from the gas/vapor stream. The recovered powder may then be calcined as previously described.

To further illustrate the process of the invention, substantially spherical aluminum hydroxide/oxide particles were produced in an apparatus using, respectively, laminar flow conditions, turbulent flow conditions without seed nuclei, and turbulent flow conditions with seed nuclei of aluminum hydroxide/oxide. The apparatus, which was similar to that schematically shown in FIG. 2, consisted of a water vaporizer maintained at 42° C., a 22 liter alkoxide vaporizer maintained at approximately 150° C., a 12 foot long condenser having a 1 cm I.D. maintained at about room temperature, i.e. 22° C.

As shown in Table I, the nitrogen flow rate through the alkoxide vaporizer in the laminar flow condition was about 5 liters per minute and about 1 liter per minute through the water vaporizer resulting in a Reynolds number at the condenser outlet of about Re=500. For the turbulent flow conditions, the alkoxide vaporizer had a nitrogen flow rate of 35 liters per minute, and the water vaporizer had a flow of 7 liters per minute for a Reynolds number at the condenser of Re=3500.

The results in Table II show a yield for turbulent flow without seeding which is practically an order of magnitude higher than the corresponding laminar flow condition. When the seed nuclei are generated in the apparatus and mixed with the alkoxide vapor adjacent the condenser, the powder rate per hour practically doubles the non-seeded reaction. It will be further noted that while the seeded turbulent flow sample run was not conducted as long as the unseeded turbulent flow run, the amount of alkoxide condensed on the condenser wall and collected in the trap was much greater for the unseeded run. The presence of the seed in the stream apparently reduces the amount of alkoxide which condenses on the walls and thus further increases the yield of powder produced.

TABLE I

| | Reaction Conditions | | |
|---|---|---|---|
| Flow Type | Laminar | Turbulent | Turbulent |
| Seeding | No | No | Yes |
| Nitrogen Gas Rates | | | |
| Alkoxide Vaporizer (1 pm) | 5 | 35 | 35 |
| Water Vaporizer (1 pm) | 1 | 7 | 7 |
| Seed Water Vaporizer (cc/min) | — | — | 2.5-5.0 |
| Reynolds No. at Condenser | 500 | 3500 | 3500 |
| Temperatures (°C.) | | | |
| Alkoxide Vaporizer | 151 | 150 | 148 |
| Water Vaporizer | 42 | 42 | 42 |
| Seed Water Vaporizer | — | — | 21 |
| Condenser In | 148 | 150 | 151 |
| Condenser Out | 16 | 5 | 6 |
| Hydrolyzer #1 | 51 | 50 | 48 |
| Hydrolyzer #2 | 22 | 22 | 22 |
| Run Duration (Hrs.) | 19 | 23 | 4 |

TABLE II

| | Products (grams) | | |
|---|---|---|---|
| Flow Type | Laminar | Turbulent | Turbulent |
| Powder in Hydro #1 | 6.8 | 105.6 | 28.5 |
| Powder in Filter | 7.7 | 120.5 | 42.9 |
| Total Powder | 14.5 | 226.1 | 71.4 |
| Alkoxide in Liquid Trap | 10 | 530 | 60 |
| Total Powder Rate (g/hr) | 0.7 | 9.8 | 17.9 |
| Alkoxide Liquid Trap Rate - (g/hr) | 0.5 | 23.0 | 15.0 |
| Powder Plus Liquid Rate (g/hr) | 1.2 | 32.8 | 32.9 |
| Powder/Liquid Ratio | 1.4 | 0.4 | 1.2 |

While we do not wish to be bound by any particular theory of operation, it would appear that the reason turbulent flow conditions may be maintained, and indeed, actually are preferred, in the present reaction (even though prior art users cautioned against such turbulent flow and instead attempted to maintain laminar flow) may be due to the use of seed nuclei comprising the same material as is generated in the hydrolyzer, thus resulting in a more uniform particle size distribution than was previously thought possible by others relying on either homogeneous nucleation or on the use of seed particles of impurities such as AgCl. In this regard, it has been also noted that while a substantial amount of alkoxide vapor may be lost to the condenser wall with turbulent flow, compred to laminar flow, this amount is reduced when using the seeding process of the invention.

In any event, the maintenance of a turbulent flow permits a high throughput resulting in higher yields without compromising the purity or the size uniformity of the resultant product due to the use of the same seed material as the hydrolysis product. Furthermore, the use, in a turbulent flow reaction, of the seed nuclei produced in accordance with the invention nearly doubles the powder production rate in contrast to the same reaction without the use of such seed nuclei.

Having thus disclosed the invention, what is claimed is:

1. A process for the production of high purity substantially spherical metal oxide particles using seed nuclei consisting of particles of the same metal, which is in the hydroxide form, as produced by the process without introducing impurities which comprises:

(a) forming a metal alkoxide vapor;

(b) reacting said vapor with a non-reactive gas containing sufficient water vapor to hydrolyze a portion of the metal alkoxide vapor to form solid seed nuclei of metal hydroxide;

(c) cooling the remaining metal alkoxide vapor containing the metal hydroxide seed nuclei sufficiently to form an aerosol comprising finely divided metal alkoxide liquid condensed on said solid metal hydroxide seed nuclei;

(d) hydrolyzing said metal alkoxide aerosol while maintaining said aerosol under a turbulent flow condition, by contact with water vapor to hydrolyze said metal alkoxide liquid on said solid metal hydroxide seed nuclei to form substantially spherical metal hydroxide particles; and (e) calcining said substantially spherical metal hydroxide particles to form the corresponding metal oxide.

2. The process of claim 1 wherein said metal alkoxide vapor is formed by bubbling a non-reactive carrier gas through a heated liquid comprising said metal alkoxide liquid.

3. The process of claim 2 wherein the amount of water vapor in said non-reactive gas containing water vapor is controlled by controlling the temperature.

4. The process of claim 3 wherein the flow rate of said non-reactive gas containing water vapor for use in forming said seed nuclei is from 0.0001 to 100 cc per minute.

5. The process of claim 1 wherein said alkoxide vapor is formed by bubbling a non-reactive carrier gas preheated to a temperature of from 100° to 250° C. through a metal alkoxide liquid maintained at a temperature of from 100° to 250° C. to form a vapor having a temperature of from 100° to 250° C.

6. The process of claim 2 wherein said cooling is carried out at a temperature of from −40° to +40° C.

7. The process of claim 6 wherein the residence time in step (c) is from 0.1 to 10 seconds.

8. The process of claim 7 wherein the residence time in step (c) is about 0.2 seconds.

9. The process of claim 7 wherein said metal alkoxide aerosol is contacted by a stoichiometric excess amount of said water vapor at a temperature of from about 40° to 60° C. to hydrolyze substantially all of said metal alkoxide aerosol to the corresponding metal hydroxide.

10. The process of claim 9 wherein step (d) is carried out at a temperature of from 20° to 100° C. to insure complete hydrolysis of said metal alkoxide vapor.

11. The process of claim 10 wherein the residence time in step (d) is from 0.1 to 10 seconds.

12. The process of claim 1 wherein a seed nuclei concentration in step (b) is from $10^5$ to $10^9$ nuclei per cc of said vapors.

13. A process for the formation of high purity substantially spherical particles of aluminum hydrate which comprises:

(a) reacting aluminum with a butanol to form an aluminum butoxide;

(b) heating said aluminum butoxide to a temperature of from 125° to 150° C.;

(c) passing 100 parts of preheated nitrogen gas through said heated aluminum butoxide to form a nitrogen/aluminum butoxide vapor stream having a temperature of from 125° to 150° C.;

(d) passing $10^{-1}$ to $10^{-7}$ parts of nitrogen through a source of high purity water at about room temperature to form a nitrogen/water vapor stream;

(e) blending said streams together to cause a portion of said aluminum butoxide to hydrolyze by reaction with said water to form a concentration of from $10^5$ to $10^9$ finely divided aluminum hydrate seed nuclei per cc;

(f) passing the resultant mixture through a condensation zone to form an aerosol by condensation of said aluminum butoxide vapors on said aluminum hydrate seed nuclei; and (g) contacting, in a hydrolysis zone, said aerosol which is under a turbulent flow condition with a sufficient amount of nitrogen/water vapor stream formed by passing nitrogen gas through a reservoir of water to form a nitrogen/water vapor mixture to provide a stoichiometric excess of water with respect to said aerosol.

* * * * *